United States Patent [19]

Godbersen

[11] Patent Number: 4,900,216
[45] Date of Patent: Feb. 13, 1990

[54] BOAT TRAILER HULL SUPPORT SWIVEL ROLLER CLUSTER

[76] Inventor: Byron L. Godbersen, Lake LaJune Estates, Ida Grove, Iowa 51445

[21] Appl. No.: 351,926

[22] Filed: May 15, 1989

[51] Int. Cl.$^4$ .............................................. B60P 3/10
[52] U.S. Cl. ................................... 414/534; 414/482; 280/414.1; 193/35 R
[58] Field of Search ............... 414/482, 483, 484, 529, 414/530, 531, 532, 533, 534, 535, 536; 280/414.1, 414.2, 414.3; 193/35 R, 37

[56] References Cited

U.S. PATENT DOCUMENTS

| | | | |
|---|---|---|---|
| 3,892,320 | 7/1975 | Moore | 280/414.1 X |
| 3,917,087 | 11/1975 | Godbersen | 414/534 |
| 4,329,108 | 5/1982 | Godbersen | 280/414.1 X |
| 4,530,634 | 7/1985 | Johnson | |
| 4,560,316 | 12/1985 | Daniels | 414/529 X |

OTHER PUBLICATIONS

EZ Loader Boat Trailer Catalog, Sep. 1986.

Primary Examiner—Frank E. Werner
Assistant Examiner—John VandenBosche
Attorney, Agent, or Firm—Henderson & Sturm

[57] ABSTRACT

A boat trailer having a frame, a pair of wheels, a mechanism for connecting the trailer to a prime mover, and a roller arrangement rearwardly on the frame for loading, unloading and supporting a boat: the improvement comprising a novel roller arrangement mounting device for a pair of roller assemblies each of which has a pair of rollers, and wherein a single non-metal mounting block provides independent rotatable engagement with the roller assemblies and with a frame connected mounting arm, whereby the roller assemblies are simultaneously rotatable about axes transverse to the frame longitudinal axis and within normally vertical planes to maintain the rollers in constant engagement with the boat hull.

8 Claims, 2 Drawing Sheets

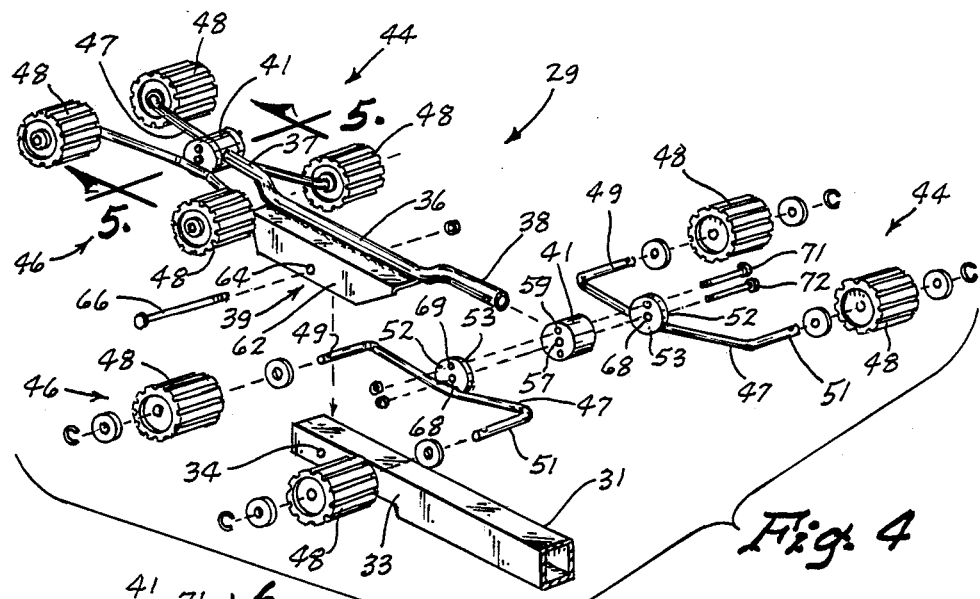
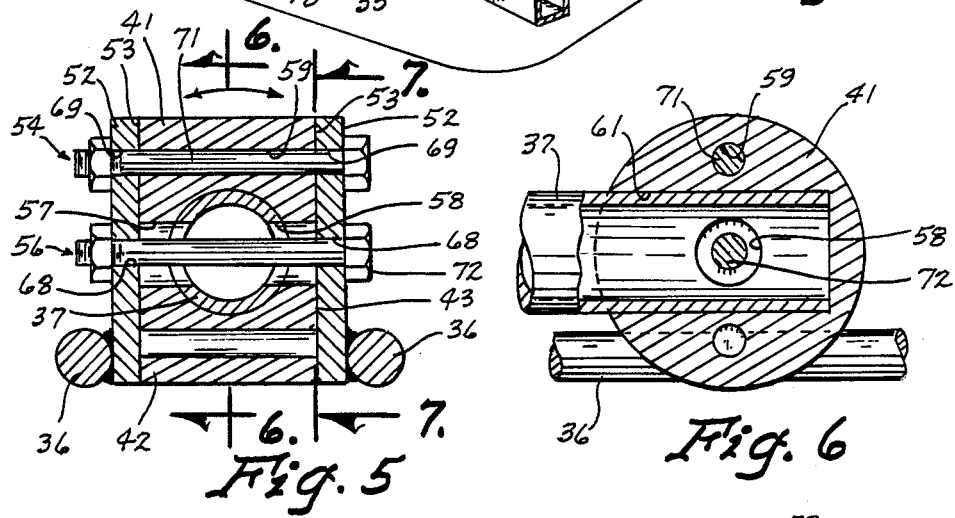
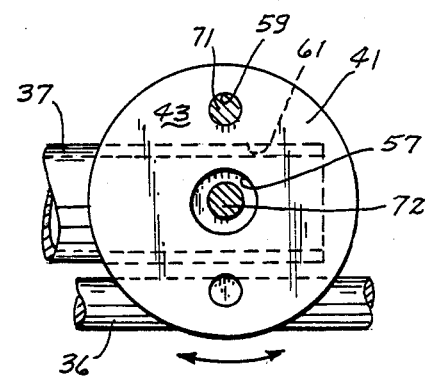

BOAT TRAILER HULL SUPPORT SWIVEL ROLLER CLUSTER

TECHNICAL FIELD

This invention relates generally to trailers especially adapted for supporting pleasure-type boats, and more particularly to the type of trailer having mounted adjacent the rear thereof a large number of rollers which rotatably engage the hull of the boat during loading, provide an equal weight distribution for the boat during transportation, and again rotatably engage the boat during launching of the boat.

BACKGROUND ART

Initially, elongated stationary bunks were mounted on the frame of a trailer for engaging the hull of a boat during loading, transporting and launching of the boat. Subsequently, in an effort to effect better weight distribution of the boat hull on the trailer, a plurality of rollers were substituted for the bunks with increased efficiency regarding decreasing friction and increasing the flexibility of the support. Finally, gangs of roller assemblies were developed and mounted on pivotally swingable cross members for maintaining full-line hull support during all phases of operation of the trailer, as shown in U.S. Pat. Nos. 3,892,320; 3,917,087 and 4,530,634.

These structures, nevertheless, still continue to use metal mounting elements for the hard rubber or like rollers, with a plurality of unnecessary parts for effecting certain pivotal and rotational movement of the roller assemblies, and all subject to rapid deterioration when used in salt water.

It is to an elimination of unnecessary parts, to a development of elements eliminating metal on metal, and to the provision of an improved mounting unit for the roller assemblies that this application is directed.

DISCLOSURE OF THE INVENTION

In a wheeled trailer adapted to be connected to a prime mover, having a pair of frame members converged at one end and diverged at opposite ends such as to be parallel each other, a cross member extended between and connected to the frame members at the diverged ends, the improvement a swivel roller assembly comprising an elongated element having opposed aligned ends; a unit for mounting the element on the cross member whereby the opposed ends extend in a direction parallel the diverged frame members; a non-metallic block mounted on each opposed end for rotation about an axis parallel to the diverged frame members, and having opposed flat faces on opposite sides, the faces disposed in planes parallel the diverged frame members; first and second roller assemblies each having a mounting bar with a roller mounted on each bar end and extended parallel each other, and each roller assembly having a non-metallic plate secured to the mounting bar, the plates having a flat surface for mating engagement with one of the block faces; a first pin unit inserted through and pivotally connecting a plate to each face of the block; and a second pin unit inserted through the plates and block, with an over-sized opening in the block providing for arcuate movement of the plates relative to the block, whereby the first and second roller assemblies are pivotally movable about transverse axis relative to each other.

It is an object of this invention to provide a new and novel swivel roller assembly.

It is another object of this invention to provide an improved swivel roller assembly comprising a pair of independently rotatable roller units interconnected by a single non-metallic block and a pair of plates in face-to-face pivotal engagement therewith.

Yet another object of this invention is the provision of a pair of roller units independently rockable about axes transverse to the frame members and interconnected by a non-metallic block unit.

BRIEF DESCRIPTION OF THE DRAWINGS

These and other attributes of the invention will become more clear upon a thorough study of the following description of the Best Mode for Carrying Out the Invention, particularly when reviewed in conjunction with the accompanying drawings, wherein:

FIG. 4 is an exploded, perspective view of one of the swivel roller assemblies of this invention;

FIG. 5 is an enlarged sectional view taken along the lines 5—5 in FIG. 4;

FIG. 6 is a sectional view taken along the lines 6—6 in FIG. 5; and

FIG. 7 is a sectional view taken along the line 8—8 in FIG. 5.

BEST MODE FOR CARRYING OUT THE INVENTION

Figure 1:
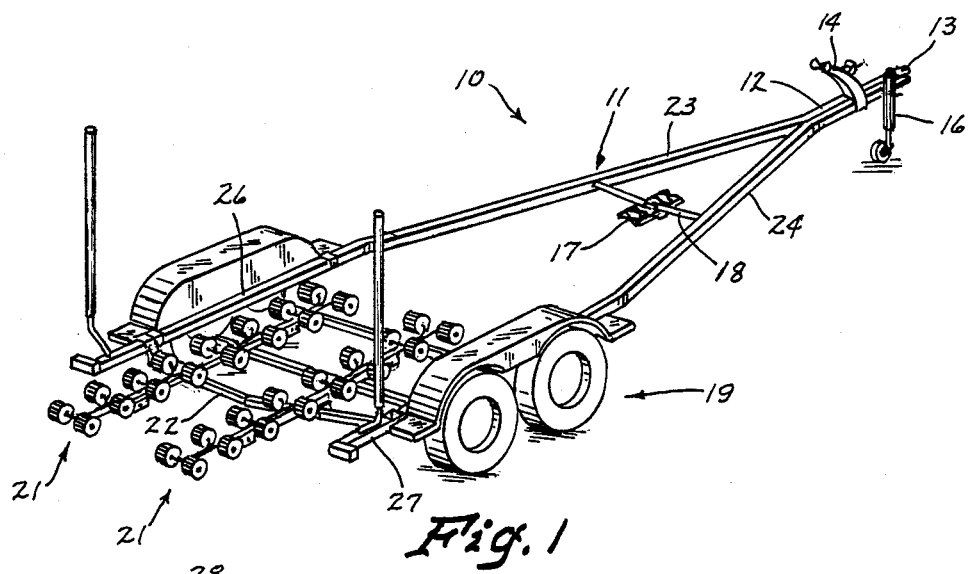
FIG. 1 is a perspective view of the boat trailer showing the swivel roller assembly of this invention mounted on a cross member adjacent the rear of the trailer, and disposed between a pair of conventional, transversely spaced frame members of the boat trailer.
Figure 2:
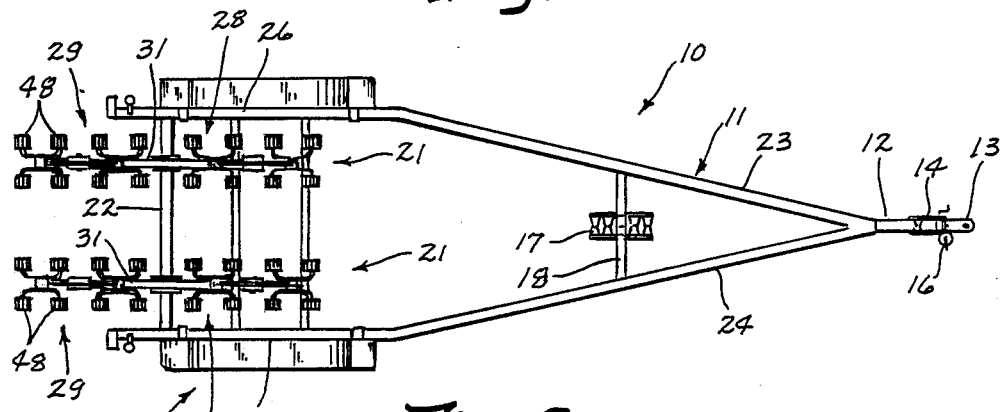
FIG. 2 is a top plan view thereof.

Referring now to the drawings, the boat trailer of this invention is illustrated generally at (10) in FIGS. 1 and 2 and comprises a frame assembly (11) including a tongue (12) and hitch (13) for conventional attachment to a prime mover (not shown); a winch assembly (14) for detachable connection to a boat (not shown) to be transported thereby; a stand assembly (16) for supporting the frame assembly (11) in a horizontal condition; an articulated front keel supporting assembly (17) mounted on a front cross bar (18); a dual wheel and axle assembly (19) for supporting the frame assembly (11) adjacent the end thereof; and a pair of in-line swivel roller groups (21) mounted on a cross member (22). It will be noted that the forward frame portions (23), (24) converge to the tongue (12), and the rearward frame portions (26), (27) diverge to a parallel relationship (FIG. 2).

Each swivel roller group (21) is identical such that only one will be described. The group (21) comprises a pair of swivel roller assemblies (28), (29), each of which is identical and which assemblies (28), (29) are mounted forwardly and rearwardly, respectively, on an elongated beam (31) (FIG. 3) which is secured intermediate its ends to the cross member (22). It will be noted that the swivel roller groups (21) are mounted on the cross member (22) in transversely and equidistantly spaced relationship relative to the longitudinal centerline (32) of the trailer, and with the forward and rearwardly mounted swivel roller assemblies (28), (29) mounted on their respective beam (31) such as to be in a balanced relationship.

Figure 3:
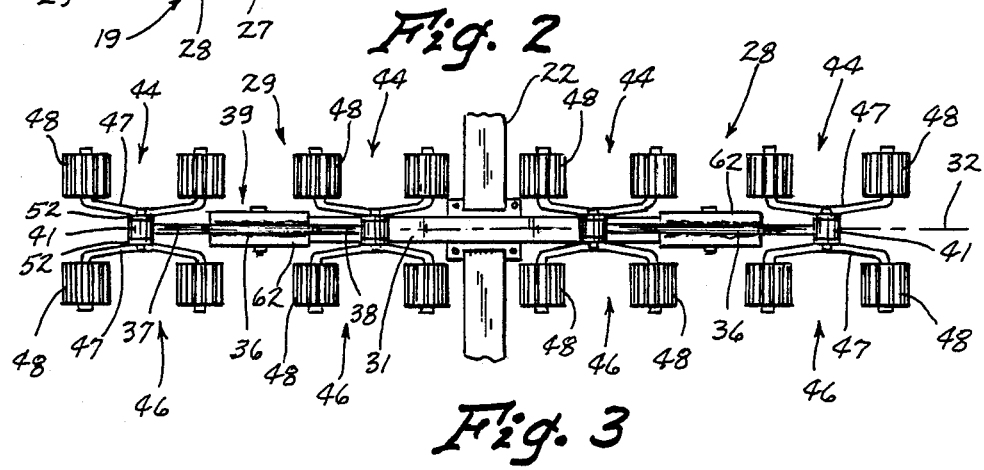
FIG. 3 is an enlarged fragmentary view of one group of swivel roller assemblies arranged in line.

As each swivel roller assembly (28), (29) is identical, one will be described, the rear swivel roller assembly (29) as best illustrated in FIGS. 3 and 4. It will first be noted that the rear end (33) of the elongated beam (31) has a transverse opening (34) formed therein for purposes hereinafter described.

Generally the rear assembly (29) comprises an elongated element (36) having opposed aligned ends (37), (38); a mounting unit (39) for mounting the element (36) on the cross member (22) whereby the opposed ends (37), (38) extend in a direction parallel to the trailer longitudinal axis (32) and the frame portions (26), (27); a non-metallic block (41) (FIG. 4) which is mounted on each opposed end (37), (38) for rotation about an axis parallel to the frame portions (26), (27), and which block (41) has opposed flat faces (42), (43) on opposite sides thereof, the faces (42), (43) disposed in planes normally parallel to the frame portions (26), (27); including further first and second swivel roller units (44), (46) each unit having a mounting bar (47) with a roller (48) mounted on each bar end (49), (51) thereof with the rollers (48) extended parallel each other; and further with a non-metallic plate (52) secured to the mounting bar (47) intermediate the ends (49), (51) thereof, each plate (52) having a flat surface (53) for mating engagement with one of the block faces (42), (43); a first pin unit (54) inserted through and pivotally connecting a plate (52) to each face (42), (43) of the block (41); and a second pin unit (56) which is inserted through the pair of plates (52) and the block (41) (FIG. 5), with an oversized opening (57) provided in the block (41) providing for arcuate movement of the first and second swivel roller units (44), (46) about the first pin unit (54) and relative to the block (41), and whereby the first and second roller units (44), (46) are pivotally movable about an axis transverse to the boat trailer frame assembly (11).

More particular, the elongated element (36) (FIG. 4) has oversized openings (58) (FIG. 5) formed transversely in each end whereby to match the transverse opening (57) of the block (41). Additionally, the block (41) not only has the first opening (57) which is formed centrally therein (FIG. 5), but is also provided with a second opening (59) formed therethrough and offset from the central opening (57). The block (41) is provided further with a bore (61) (FIGS. 5 and 6) for receiving the respective ends (37), (38) of the element (36), and whereby the block (41) is rotatable about the element end (37) or (38) within a normally vertical plane disposed transverse to the trailer frame (11). The first opening (57) formed transversely in the block (41) communicates with and extends through the bore (61) (FIGS. 5 and 6) at right angles therewith.

The mounting unit (39) comprises a U-shaped housing (62) (FIG. 4) to which the element (36) is secured as by welding, and which housing (62) embraces the beam end (33), and which housing (62) also has a pair of openings (64) formed therein to match the beam opening (34) to receive a pin (66) for fastening the housing (62) in a pivotal manner on the beam (31). Thus the entire swivel roller assembly (29) is pivotally mounted on the beam (31). Each swivel roller unit (44), for example, includes further having the mounting bar (67) U-shaped whereby the ends (49) and (51) are parallel and extend transversely of the frame (11); with each plate (52) having a central opening (68) (FIG. 5) formed therein which is alignable with the block opening (57), and which also has an offset opening (69) formed therein alignable with the block second opening (59).

The first pin unit (54) comprises a bolt fastener (71) (FIG. 5) which extends through each plate and block aligned openings (69) and (59) whereby to pivotally connect the plates (52) with their respective faces (53) against the outer faces (42), (43) of the block (41). The second pin unit (56) (FIG. 5) also comprises a bolt fastener (72) with a circumferential size smaller than the size of the openings (57), (58) of the block and element ends (41), (37) or (38) whereby the plates (52) may pivot within a vertical plane and about an axis transverse to the trailer frame (11), the amount of pivoting depending upon the lost-motion space provided therefore of the bolt fastener (72) (FIG. 6) within the oversized central openings (57), (58) of the block (41) and elements ends (38), (39) as previously described.

Accordingly, it can be seen that the illustrated embodiment of the present invention accomplishes all of the objectives referred to hereinbefore. Obviously, many modifications and variations of the present invention are possible in light of the above teachings. It is therefore to be understood that, within the scope of the appended claims, the invention may be practiced otherwise than as specifically described.

I claim:

1. In a wheel trailer for boats adapted to be connected to a prime mover, having a pair of frame members converged at one end of each member and diverged at the other ends, a cross member extended between and connected to the frame members at the diverged ends, the improvement of a roller assembly comprising:

elongated means having opposed aligned ends;
means mounting said elongated means on the cross member whereby said elongated means extend in a direction parallel the longitudinal axis of the trailer;
a non-metallic block rotatably mounted on each of said opposed ends for rotation in a generally vertical plane extended transverse the longitudinal axis, and with opposed flat faces on either side thereof, said faces disposed in planes generally parallel to the trailer longitudinal axis;
first and second roller assemblies each having a mounting element with at least one roller mounted thereon for rotation about a generally horizontal axis disposed normal to the trailer longitudinal axis and having a non-metallic plate on said mounting element with a flat surface for mating engagement with one of said block faces;
first pin means pivotally mounting each of said roller assemblies to opposite faces of said block off-center thereof; and
second pin means connecting each said block and said roller assemblies as a unit on each opposed end of said elongated means and providing lost-motion movements between said plates and said block, whereby said roller assemblies are pivotal relative to said block about generally horizontal axes extended normal to the trailer longitudinal axis.

2. The roller assembly of claim 1, and wherein said elongated means includes an elongated member having tubular ends, each end having an opening therein.

3. The roller assembly of claim 2, and further wherein said block has a first opening formed centrally therein and transversely therethrough, and has a second opening formed offset above said first opening and transversely therethrough so as to be parallel with said first opening.

4. The roller assembly of claim 3, and further wherein each plate has an opening formed centrally therein alignable with said block first opening, and has another opening formed offset said plate central opening and alignable with said block offset opening.

5. The roller assembly of claim 4, and further wherein said first pin means is inserted through said offset openings of both plates and through said block offset opening whereby to fasten said plates and block together for pivotal movement of said plates about said first pin means relative to said block.

6. The roller assembly of claim 5, and further wherein said second pin means is inserted through said central openings of both said plates and through said block first central opening, and is further inserted through said tubular end opening at each end of said elongated member to connect said plates and said block to said elongated member, said second pin means arcuately movable within said block first opening whereby said first and second roller assemblies are pivotally movable relative to said block within normally vertical planes.

7. The roller assembly of claim 6, and further wherein said block has a bore formed therein for rotatably receiving an elongated member tubular end, whereby said block is rotatable about said tubular end within a normally vertical plane disposed transverse to the trailer.

8. The roller assembly of claim 7, and further wherein said first opening of said block communicates with and is extended through said bore at right angles therewith.

* * * * *